United States Patent Office 3,212,981
Patented Oct. 19, 1965

3,212,981
NUCLEAR REACTORS
Louis Henri Joseph Tollet and Pierre Edmond Jules Marie Maldague, both of Brussels, Belgium, assignors, by mesne assignments, to Société anglo-belge Vulcain, Société Anonyme, Brussels, Belgium
Filed Feb. 21, 1962, Ser. No. 174,793
Claims priority, application Belgium, Mar. 9, 1961, 601,104
9 Claims. (Cl. 176—36)

This invention relates to nuclear reactors, and more particularly to their shutoff or control rods and to the actuating mechanism of the latter.

Such shutoff rods should be held outside the core, whilst working under power. In order to stop the reactor, the said rods should be introduced in a very short time and that, independently of any accidental circumstances such as blocking of the mechanism, failure of motive power, etc.

The invention relates to a shutoff or control rod meeting such requirements.

According to the invention, all the movements of the shutoff or control rod are carried out by means of members actuated by differences of pressure normally met inside the vessel enclosing the core, or in circuits connected with the reactor.

Such differences of pressure may be obtained from connections with housings inside which reign different pressures.

A telescopic device may be used for retaking the freed rod (therefore introduced into the core), bring it to the position 'freed" and place it under stress, that is in the state which it must have for a new introduction into the reactor.

For the facility of the description, a tubular rod has been chosen. It is however obvious that any other form may be utilized. For each form considered, it will be necessary to find the suitable shape and situation for the actuating members.

When the rod is solid, the actuating members may for instance be placed at the end of the rod, without being integral therewith.

The accompanying drawings show by way of example a mode of carrying the invention into effect.

Figure 1:
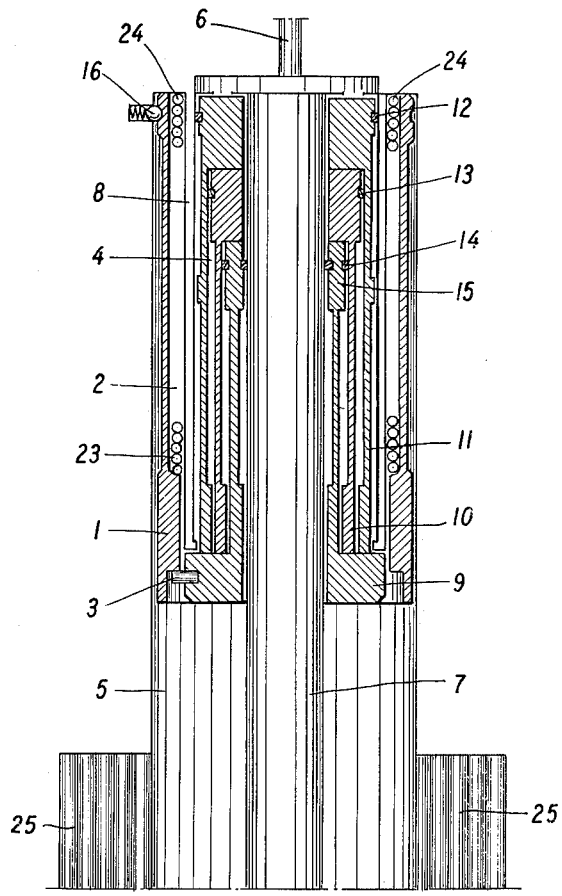
FIGURE 1 is a longitudinal section in an assembly of shutoff or control rod with its driving mechanism.
Figure 2:
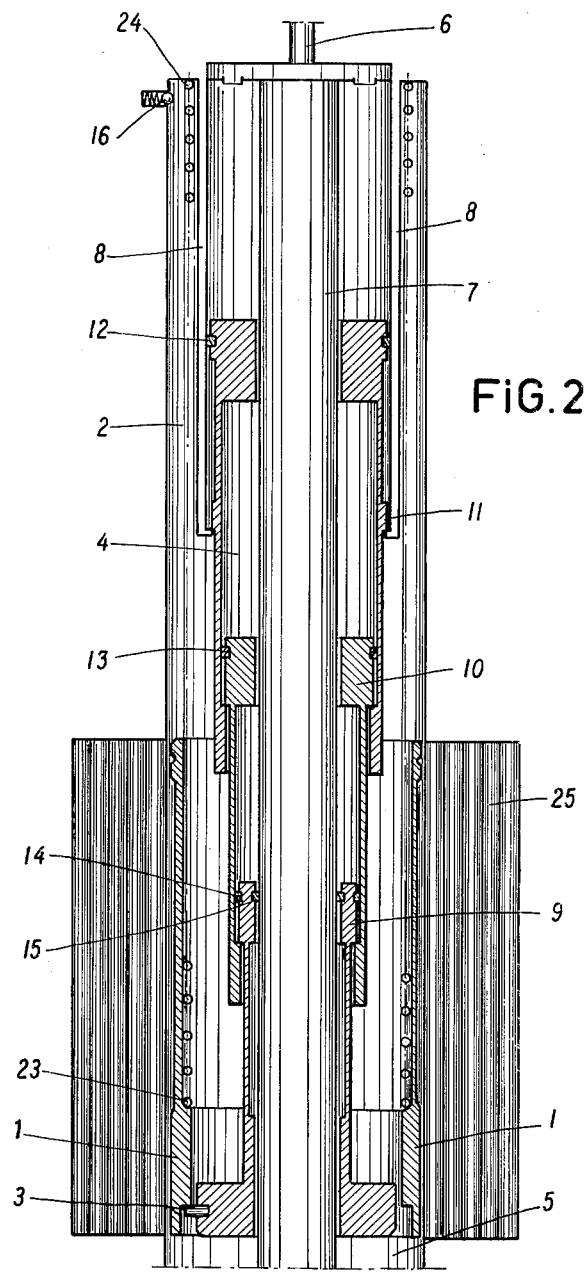
FIGURE 2 is a longitudinal section in the said assembly of shutoff or control rod with its driving mechanism, for another position.

Referring to FIGURE 1, the reference numeral 1 shows a shutoff rod 1, its actuating mechanism being placed inside the rod in the position "withdrawn from the core"; FIGURE 2 shows this same apparatus when the rod is introduced into an empty space of the core and the mechanism has been advanced for retaking the rod to bring it into the position shown in FIGURE 1.

Figure 3:
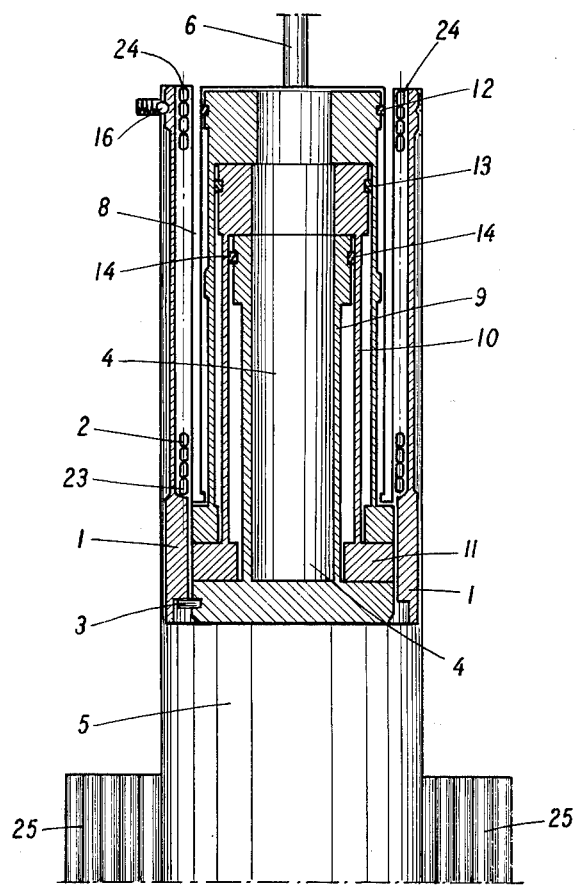
FIGURE 3 is a longitudinal section in another assembly of shutoff or control rod with its driving mechanism.

Referring now more in detail to FIGURE 1, the rod is brought into motion by a spring 2. It slides inside a chamber 5 provided in the core 25. The reference numeral 3 shows bolts shown in detail in FIGURE 4, which can bring the rod 1 to be integral with a telescopic system 4. The reference numeral 6 shows a duct for placing the entire upper part of the chamber 5 under adjustable pressure. The numeral 7 shows a central guide for the telescopic system 4; (such a guide does not exist in the device shown in FIGURE 3). The reference numeral 8 shows an outer guide for the telescopic system 4 and an inner guide for the spring 2. The numerals 9, 10, and 11 show sliding pieces of the telescopic system. The reference numerals 12, 13, 14 and 15 show tightjoint rings arranged in such a manner that they are situated in the core only during the very short duration necessary for lengthening the telescopic system with a view to hooking the shutoff rod and bringing it to the position "withdrawn from the core."

At 16 dogs having an alternating motion are placed, which retain the rod in its position withdrawn from the core but are drawn aside when the spring 2 expands to bring the rod 1 into the core.

*Mode of operation*

Let us suppose that the chamber 5 is under an average pressure P.

In order to obtain such pressure, the chamber may for instance be connected with any part of the reactor or of the circuits associated with the reactor. Such average pressure may also be obtained by a connection adapted to be regulated, having two housings in which reign pressures $P+a$ and $P-b$, $a$ and $b$ being positive.

It is possible to obtain a pressure P, by take-offs capable of being regulated, on $P+a$ and upon $P-b$.

A fitting 6 may be placed, according to the requirements, in communication with housings in which reigns a pressure P1 higher than P, or P2 smaller than P. The fitting 6 may also be simultaneously placed through the intermediary of a regulating member, in communication with P1 and P2 in order to obtain according to requirements, all the pressures graded between P1 and P2.

Pistons 9, 10 and 11 are made as long as possible to ensure a maximum guiding, whilst allowing the necessary clearances to ensure a free movement.

Figure 4:
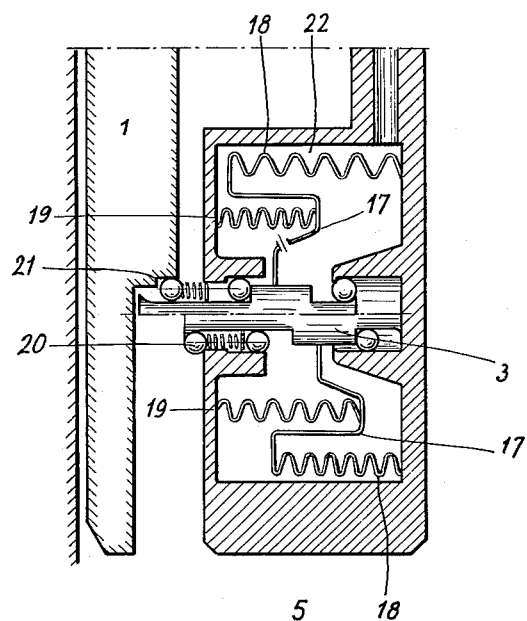
FIGURE 4 is an enlarged sectional view of a portion of the apparatus shown in the preceding figures.

The bolts shown in detail in FIGURE 4 carry a circular enlargement 17 upon which bear springs 18 and 19 of different strengths on either side of bellows.

The bolts 3 slide through the intermediary of balls 20, in order to reduce the friction, inside their housing and against the abutting member 21 of the rod 1, through the intermediary of which they take support upon the rod 1.

The face of the pistons 9, 10 and 11 (FIGURE 1) facing the chamber 5 is always subjected to the pressure P of the chamber. The upper face of the pistons 9, 10 and 11 is always subjected to the same pressure as that reigning in the fitting 6. The chamber 22 (FIGURE 4) limited by the bellows-springs 18 and 19 is connected with the fitting 6 by a set of conduits. The rod is supposed to be in the freed position. Then, the pistons are nested into one another because the pressure P1, which reigns inside the fitting 6, is smaller than P. The dogs 16 come into engagement with their housing inside the rod 1.

The bolts 3 are withdrawn because a pressure P1 reigns in the chamber 22, which is smaller than the pressure P which reigns in the chamber 5. Indeed, the bellows-spring 18 is designed in such a manner that it contracts when at rest when the same pressure reigns on either side of 17, and that on the contrary it expands when solicited by the difference of pressure which reigns upon both faces of the circular enlargement 17.

In order to free the shutoff rod it is sufficient to cause a pressure equal to P reign in the fitting 6. In this case, the spring 18 tends to move to its position of contracted equilibrium, carries with it the enlargement 17 and removes the bolt 3. The freed rod is instantaneously brought to its active position after having passed without delay the spring dogs 16.

The reactor is then shut off.

At that moment, it is sufficient somewhat to reduce the pressure inside the fitting 6 in order to maintain the pistons 9, 10 and 11 in their retracted position and to prevent them from expanding (FIGURE 1) towards and inside the core.

All the mechanism remains therefore most of the time sheltered from the radiations of the reactor. The inner guiding tube (FIGURE 1), the pistons 9, 10 and 11 and the shutoff rod 1 may at predetermined places, have filling pieces and bulges forming a thermal shield when the rod is freed. In order to retake the rod which is engaged in the core, to bring it to its position of rest and bring the spring 2 under stress, it is sufficient to cause a pressure P2 higher than P reign inside the fitting 6. The telescopic system expands through a difference of pressure. In the position of maximum expansion, the bolts 3 are situated beyond the abutting member 21 of the rod. By bringing the pressure inside the fitting at a value smaller than P, the bolts are withdrawn because a pressure P1 smaller than P reigns inside the chamber 22.

They are withdrawn before the movement of contraction of the telescopic system, because the difference of pressure, which is sufficient to cause the withdrawal of the bolts, is not sufficient to overcome the frictions. If the pressure at the fitting 6 becomes sufficiently small, the pistons re-enter within each other, the bolts 3 hook on passing the step 21 (FIG. 4) of the shutoff rod and the entire system is pushed into the position freed by the higher pressure P.

At the end of the stroke, the dogs 16 come into engagement inside their housing. It should be noted that in case of accident (fall and equalizing of the pressures) the bolts reenter, the rod is freed and is placed in its position for the shutoff of the reactor by the simple effect of the spring, therefore without any outside help.

By taking the precaution of making the end winding 23 of the spring 2 integral with the shutoff rod, the spring may serve as a damper at the end of the stroke of the shutoff rod if the other end winding 24 of the spring 2 is made integral with the base of the guiding tube 8. It should be noted that by blocking the bolts 3 in their locking position ("out"), as the shutoff rod becomes integral with the telescopic system, it may be utilized as a control rod since it may be placed in any intermediary position. The regulation of the position of such a rod inside the core is very simply effected by placing the fitting 6 under a pressure Pr intermediary between P1 and P2.

Under a pressure Pr nearer to P1 than to P2, the rod withdraws until the degree of compression of the spring 2 balances the counter-pressure P-Pr.

Under a pressure Pr nearer to P2 than to P1, the rod comes into engagement under the effect of the spring until the latter is sufficiently expanded to be balanced by Pr-P.

In such a case, the position of the rod may for instance be known from the indications of a pressure gauge.

What we claim is:

1. In a nuclear reactor, the combination comprising:
   (a) a reactor vessel having a cooling fluid under pressure disposed in said vessel;
   (b) a hollow, cylindrical housing extending outwardly from said vessel and having one end in open communication with the interior of said vessel and the cooling fluid contained therein;
   (c) a control member of substantially the same length as said housing, slideably mounted in said housing and having an annular form for substantially its entire length including that end farthest from said vessel;
   (d) spring means, in the interior of the annular portion of said control member, operatively connected to said control member and normally biasing said control member in an extended position within said reactor vessel;
   (e) a telescoping, double-acting piston coaxial with said control member and mounted within the annular portion thereof;
   (f) one end of said piston being exposed to the high pressure fluid within said reactor and the other end being subjected to fluid pressure from a second source;
   (g) latch means mounted adjacent the end of said piston which is exposed to the fluid within said vessel and adapted to latch said piston to said control member when said latch is in its extended position;
   (h) bellows means connected to said latch means and exposed to fluid from said second source, whereby said latch means is extended and retracted in response to changes in pressure of said fluid; and
   (i) spring means normally biasing said bellows means to maintain said latch means in a retracted position.

2. A device in accordance with claim 1 wherein the control member terminates in a solid shut-off rod at that end of said control member which is adjacent the reactor vessel.

3. A device in accordance with claim 1 wherein the piston is an annular piston and is slideably mounted on a central guide means.

4. A device in accordance with claim 1 wherein the end of the piston exposed to the fluid within the reactor vessel is solid.

5. A device in accordance with claim 1 wherein the second source of fluid pressure supplies a constant pressure.

6. A device in accordance with claim 1 wherein the second source of fluid pressure is adjustable.

7. A device in accordance with claim 1 wherein the second source of fluid pressure is a source connected with the reactor vessel.

8. In a nuclear reactor, the combination comprising:
   (a) a reactor vessel having a cooling fluid under pressure disposed in said vessel;
   (b) a hollow housing extending outwardly from said vessel and having one end in open communication with the interior of said vessel and the fluid contained therein;
   (c) an elongated control member slideably mounted within said housing;
   (d) spring means normally biasing said control member in an extended position within said reactor vessel;
   (e) a telescoping, double-acting piston having one end exposed to the fluid within said vessel, the other end exposed to fluid from a second source of fluid under pressure and slideably mounted within said housing to slide under the influence of a difference in pressure between the two sources; and
   (f) latch means mounted adjacent that end of said piston which is exposed to fluid within said vessel and adapted to alternately latch said piston to said control member and release said control member in accordance with the differential pressure between the fluids from said two sources.

9. In a nuclear reactor having a vessel enclosing a core and a control rod adapted to displace a fluid inside said core, a mechanism for moving said control rod into said core and out of said core, comprising:
   (a) first spring means normally biasing said control rod in an extended position in said core;
   (b) double-acting piston means movable in and out of said core parallel to the movement of said control rod;
   (c) said piston means having one end exposed to fluid pressure from one source inside said vessel and the other end subjected to fluid pressure from another source inside said vessel;
   (d) latch means for alternately connecting and disconnecting said piston to said control rod; and
   (e) second spring means normally biasing said latch means out of connection with said control rod;

(f) said first and said second spring means having preselected strengths such that the differences in pressure of said two sources, under normal operating conditions of said reactor, are sufficient to overcome the biasing force of said first spring and move said control rod in and out of said core and the biasing force of said second spring to move said latch means in and out of engagement with said rod.

References Cited by the Examiner

UNITED STATES PATENTS

| | | |
|---|---|---|
| 1,827,966 | 10/31 | Bristol. |
| 2,660,028 | 11/53 | Geyer. |
| 2,725,993 | 12/55 | Smith _____ 176—35 |
| 2,852,458 | 9/58 | Dietrich _____ 176—36 |
| 2,937,984 | 5/60 | Chapellier _____ 60—51 |
| 2,975,119 | 3/61 | Emmons _____ 176—36 |
| 2,990,356 | 6/61 | Chapellier et al. |
| 3,020,887 | 2/62 | Hobson et al. |
| 3,085,962 | 4/63 | Whittaker _____ 74—84 |
| 3,107,209 | 10/63 | Frisch _____ 287—58 |

FOREIGN PATENTS

| | | |
|---|---|---|
| 216,256 | 11/57 | Australia. |
| 621,000 | 5/61 | Canada. |

OTHER REFERENCES

"Control of Nuclear Reactors and Power Plants," Mc-Graw-Hill, second edition, by Schultz, pages 234 and 236.

IDO–24020 Engineering Test Reactor, USAEC report dated July 1956, pp. 97, 125a, 126.

NAA–SR–Memo–685, U.S. Atomic Energy Commission Document, dated April 29, 1953, pp. 3, 4, 5, 7, 9, and 11.

REUBEN EPSTEIN, *Primary Examiner.*

LEON D. ROSDOL, CARL D. QUARFORTH,
*Examiners.*